(12) United States Patent
Forsmark et al.

(10) Patent No.: US 12,209,606 B2
(45) Date of Patent: Jan. 28, 2025

(54) ADDITIVELY MANUFACTURED PART WITH FASTENER SUPPORTS

(71) Applicant: Ford Global Technologies, LLC, Dearborn, MI (US)

(72) Inventors: Joy Hines Forsmark, Saint Clair Shores, MI (US); Niamh Hosking, Canton, MI (US); Raphael Koch, Odenthal (DE); Michael James Freeman, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 17/950,326

(22) Filed: Sep. 22, 2022

(65) Prior Publication Data

US 2024/0102500 A1 Mar. 28, 2024

(51) Int. Cl.
*F16B 5/02* (2006.01)
*B33Y 10/00* (2015.01)
*B33Y 80/00* (2015.01)

(52) U.S. Cl.
CPC ............... *F16B 5/02* (2013.01); *B33Y 80/00* (2014.12); *B33Y 10/00* (2014.12)

(58) Field of Classification Search
CPC ................................. F16B 5/02; F16B 19/086
See application file for complete search history.

(56) References Cited

U.S. PATENT DOCUMENTS

2019/0255611 A1 8/2019 Frank et al.
2021/0031443 A1\* 2/2021 Amanatides ............ B22F 10/00

FOREIGN PATENT DOCUMENTS

FR 3114257 3/2022

\* cited by examiner

*Primary Examiner* — Jason L Vaughan
*Assistant Examiner* — Amanda Kreiling
(74) *Attorney, Agent, or Firm* — Burris Law, PLLC

(57) ABSTRACT

A structural assembly includes a fastener and an additively manufactured component. The additively manufactured component includes a base, a void defined in the base, and a support disposed across the void. The fastener is secured to the base within the void, and the support is captured within a distal end portion of the fastener.

20 Claims, 6 Drawing Sheets

… (1)

ADDITIVELY MANUFACTURED PART WITH FASTENER SUPPORTS

FIELD

The present disclosure relates to additively manufactured vehicle components, particularly joints configured to house fasteners.

BACKGROUND

The statements in this section merely provide background information related to the present disclosure and may not constitute prior art.

Additive manufacturing offers opportunities to tailor part geometries and improve overall performance of structural parts and their assemblies. In particular, structural joints may have complex geometries for specific locations in vehicles that have space or geometric constraints. For example, a joint may include one or more voids into which a fastener is staked. In certain additive manufacturing processes, thermal stresses from sintering or other heating may deform material around the voids, causing the voids to change shape relative to their nominal geometry/dimensions beyond an acceptable manufacturing tolerance range. Accordingly, with such geometry variations, the fastener may not fit within the void.

The present disclosure addresses these challenges related to additive manufacturing of joints into which fasteners are staked, among other issues related to thermal variation of materials in additive manufacturing processes.

SUMMARY

This section provides a general summary of the disclosure and is not a comprehensive disclosure of its full scope or all of its features.

In one form, a structural assembly includes a fastener and an additively manufactured component including a base, a void defined in the base, and a support disposed across the void. The fastener is secured to the base within the void, and the support is captured within a distal end portion of the fastener.

In variations of the structural assembly, which may be implemented individually or in combination: the support is contiguous with a periphery of the void; a distal end portion of the fastener includes a flange extending along a rear surface of the base; the base includes a stop extending around the void on the rear surface; the flange of the fastener abuts the stop; the distal end portion of the fastener defines a cavity, and the support is captured within in the cavity; the support has a convex exterior profile including a dome and sloped sides extending from the dome; the fastener is a threaded stud; the fastener is a ball stud; the support includes a peripheral lip.

In another form, a method for forming a structural assembly includes additively manufacturing a base of the structural assembly, the base including a void, additively manufacturing a support across the void, locating a fastener onto the support, and staking the fastener to the base through the support.

In variations of the method, which may be implemented individually or in combination: staking the fastener further includes punching the fastener between the support and the base and deforming a distal end portion of the fastener into a flange along a rear surface of the base; staking the fastener further includes capturing the support in a cavity of the fastener; the support is removed from the cavity; additively manufacturing the base and the support further includes applying metal powder and a liquid adhesive into a plurality of layers and heating the plurality of layers to remove the adhesive; further including deforming the distal end portion of the fastener along a rear surface of the base and engaging a stop disposed on the rear surface of the base; additively manufacturing the support further includes additively manufacturing a slug and a peripheral lip extending from the slug to the base; staking the fastener further includes separating the peripheral lip from the base and securing the slug in a cavity of the fastener; further including additively manufacturing the base and the support in a metal jet binding process.

In another form, an additively manufactured component configured to join structural components together includes a base, a void defined in the base, and a support disposed across the void, the support defining a convex exterior profile including a central dome, sloped sides extending from the central dome, and a peripheral lip.

In variations of the additively manufactured component, which may be implemented individually or in combination: the additively manufactured component further includes a stop extending around the void.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
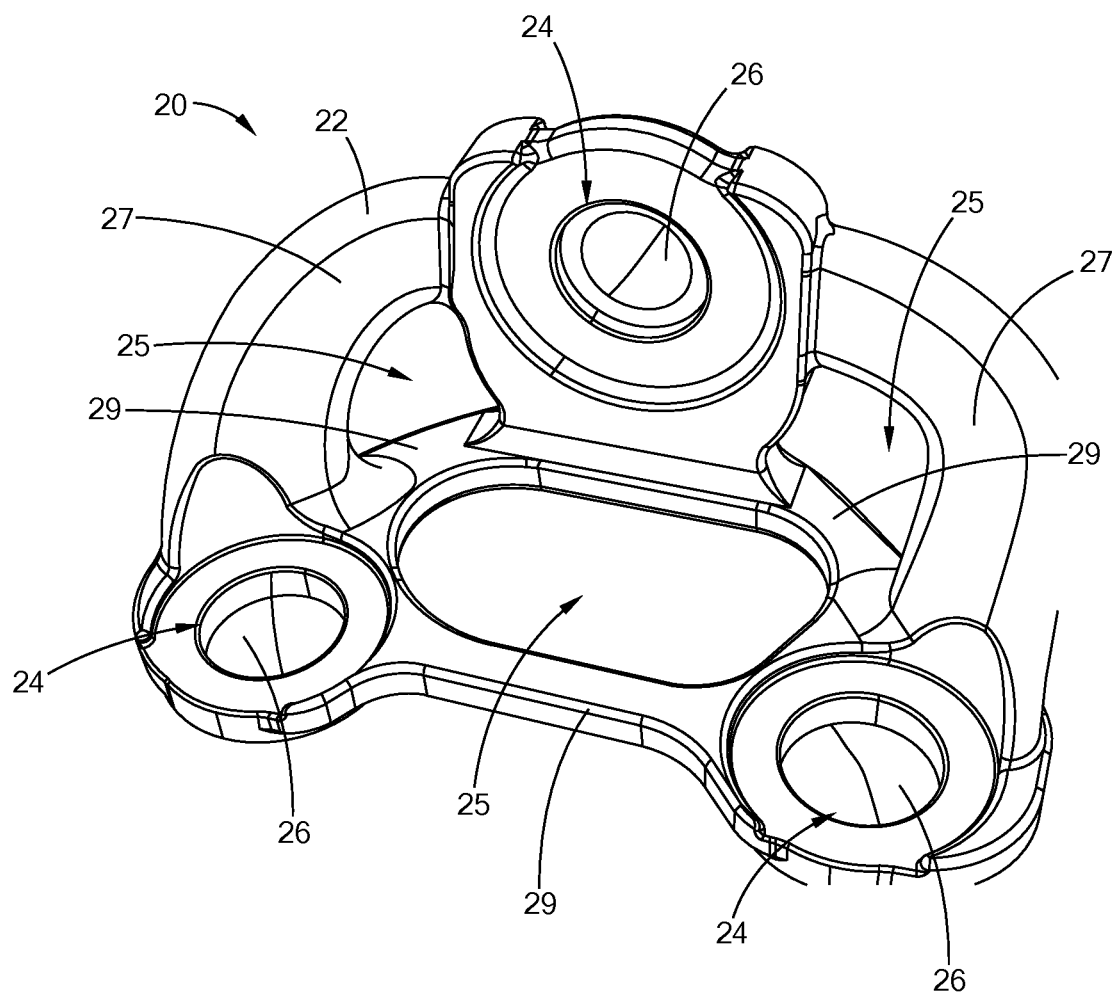
FIG. 1 is a perspective view of an additively manufactured component constructed according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, an additively manufactured component 20 includes a base 22, a plurality of voids 24 defined in the base 22, and a plurality of supports 26. In this context, a "void" is a portion of the component 20 that is configured to receive a fastener for a staking process, as described in greater detail below, even though a material actually fills this area during the additive manufacturing process. Each support 26 is disposed across one of the voids 24, providing structure to the portion of the base 22 surrounding the void 24 as described below. In the form shown, the voids 24 define circular or arcuate peripheries, and the supports 26 are solid and extend contiguously across the peripheries. In another form not shown, the voids 24 may have different shaped boundaries, such as square, rectangular, elliptical, and polygonal, among others. The voids 24 may be recessed from the base 22 or may protrude from the base 22 within the scope of the present disclosure. Further, the supports 26 may be partially discontinuous across the boundaries and within the voids 24, such by way of example a perforated or lattice construction. These and other variations of the voids 24 and supports 26 should be construed as falling within the scope of the present disclosure.

As further shown, the base 22 defines one or more openings 25, which are configured to reduce the overall weight of the component 20. Further, the base 22 in this example includes side arms 27 and lower braces 29, which are configured to carry the structural loads throughout the additively manufactured component 20. Generally, the additively manufactured component 20 is designed to join two or more parts of a vehicle, such as by way of example a roof rail to a vehicle pillar, which are not shown for purposes of clarity.

Advantageously, the base 22 and the supports 26 are formed in an additive manufacturing process, such as by way of example a metal binder jet process, a laser powder bed fusion process, or a direct material deposition process. In the metal binder jet process, layers of metal powder are bound by a polymer binder, such as a liquid polymer adhesive, into a metal-polymer structure. Then, a heat treatment is applied to remove the polymer binder, leaving joined metal to form the component. During heat treatment, the metal powder layers fuse and undergo volumetric shrinkage from the evaporative loss of the polymer binder. This volumetric shrinkage may occur unevenly through the component 20, and the metal powder around one of the voids 24 may shrink unevenly, distorting the shape of the void 24. Therefore, each support 26 is additively manufactured to extend through a diameter of the void 24 to inhibit the uneven shrinking of the material around the void 24. As the component 20 is heated during the additive manufacturing process, material around the void 24 that would otherwise distort is held in place by the support 26. Thus, the support 26 maintains the shape and size of the void 24 during volumetric shrinkage of the component 20 during heat treatment of the additive manufacturing process to maintain the dimensional stability of the void 24.

The metal powder that forms the base 22 and the supports 26 is one of steel, aluminum, titanium, or nickel, or an alloy thereof, that is conventionally used in metal jet binding. It should be understood, however, that other elements and alloys may be employed for the metal powder while remaining within the scope of the present disclosure. Although the base 22 and the supports 26 in this form are the same material, it should be understood that the base 22 and the supports 26 could be different materials while remaining within the scope of the present disclosure. Further, each of the base 22 and/or the supports 26 may comprise a variable material composition, which can be implemented more easily with an additive manufacturing process.

Figure 2:
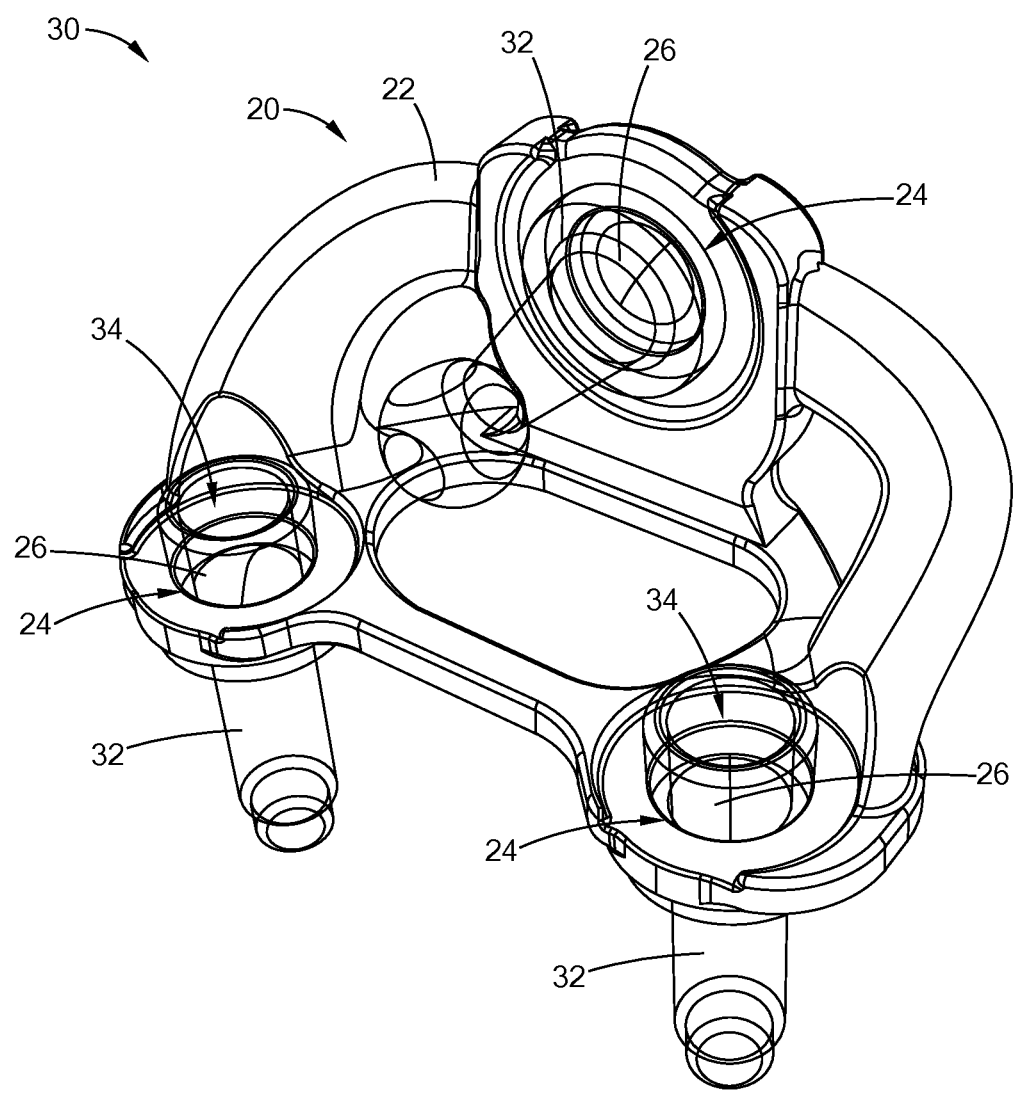
FIG. 2 is a perspective view of a structural assembly including the additively manufactured component of FIG. 1 and a plurality of fasteners according to the present disclosure.
Figure 3:
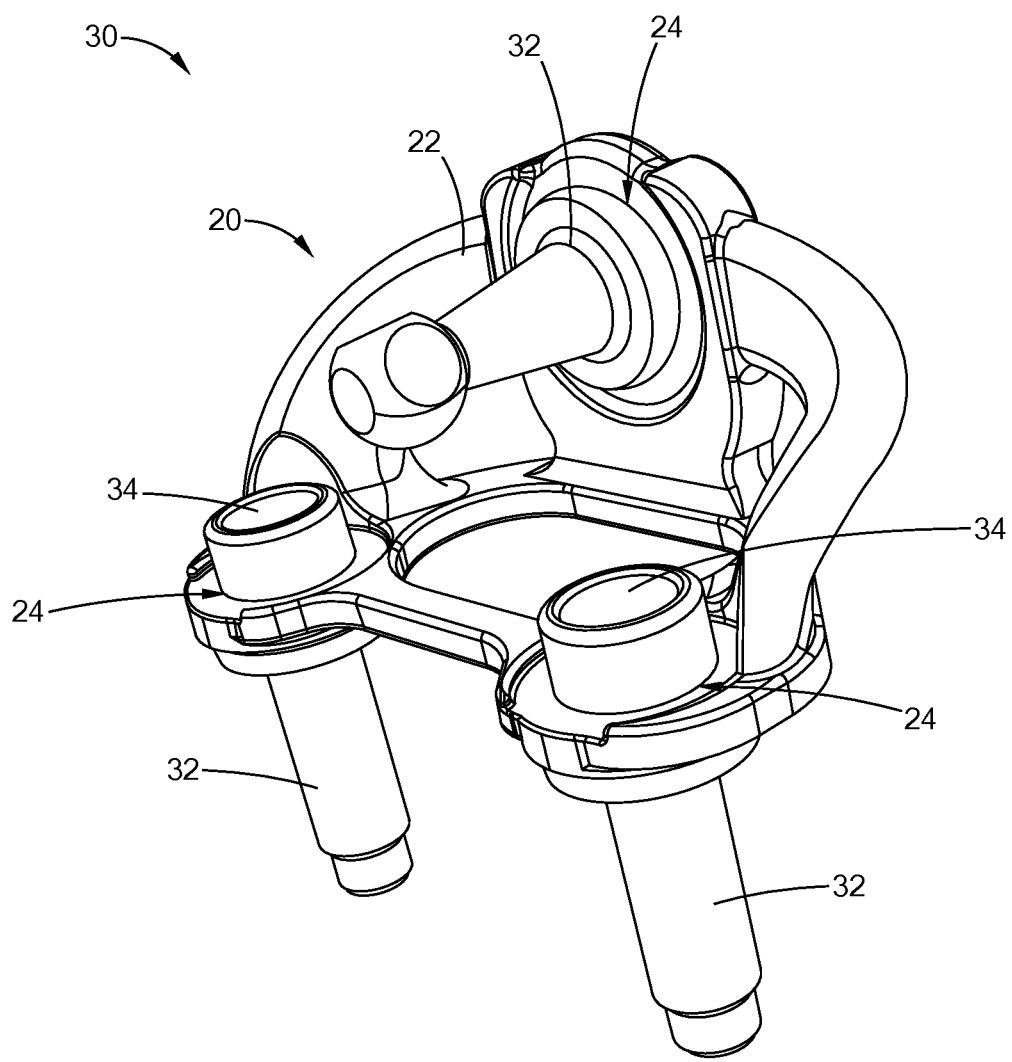
FIG. 3 is a perspective view of the structural assembly of FIG. 2 according to the present disclosure.

With reference to FIGS. 2-3, a structural assembly 30 includes the additively manufactured component 20 and one or more fasteners 32 staked to the additively manufactured component 20. In this context, a fastener 32 is "staked" to the component 20 when the fastener 32 is fixedly attached to the component 20 by piercing a support 26 and then deformed onto the component 20 to form a friction fit, which is described and illustrated in greater detail below. In the form shown, three (3) fasteners 32 are staked to the component 20 by way of example. It should be understood, however, that any number of fasteners 32 may be staked to the component 20 while remaining within the scope of the present disclosure. In this form, each fastener 32 defines a cavity 34 and the support 26 is disposed in the respective cavity 34 of the fastener 32 after the fastener 32 is staked, as described in greater detail below.

The fasteners 32 are a suitable type for the specific application, and in the form illustrated herein, the fasteners 32 include a ball stud (at the top) and two threaded studs (at the bottom). In another form, the fasteners 32 can be one of, e.g., threaded studs, ball studs, pins, or T-studs, among others. In this form, the threaded studs connect a structural element (such as a vehicle pillar) to the component 20, and the ball stud connects another structural element (such as a lift cylinder) to the component 20. It is within the scope of the disclosure to connect other parts of the vehicle to the component 20, such as by way of example wire bundles, trim panels, brackets, speakers, antennas, and liftgate struts, among others.

Figure 4A:
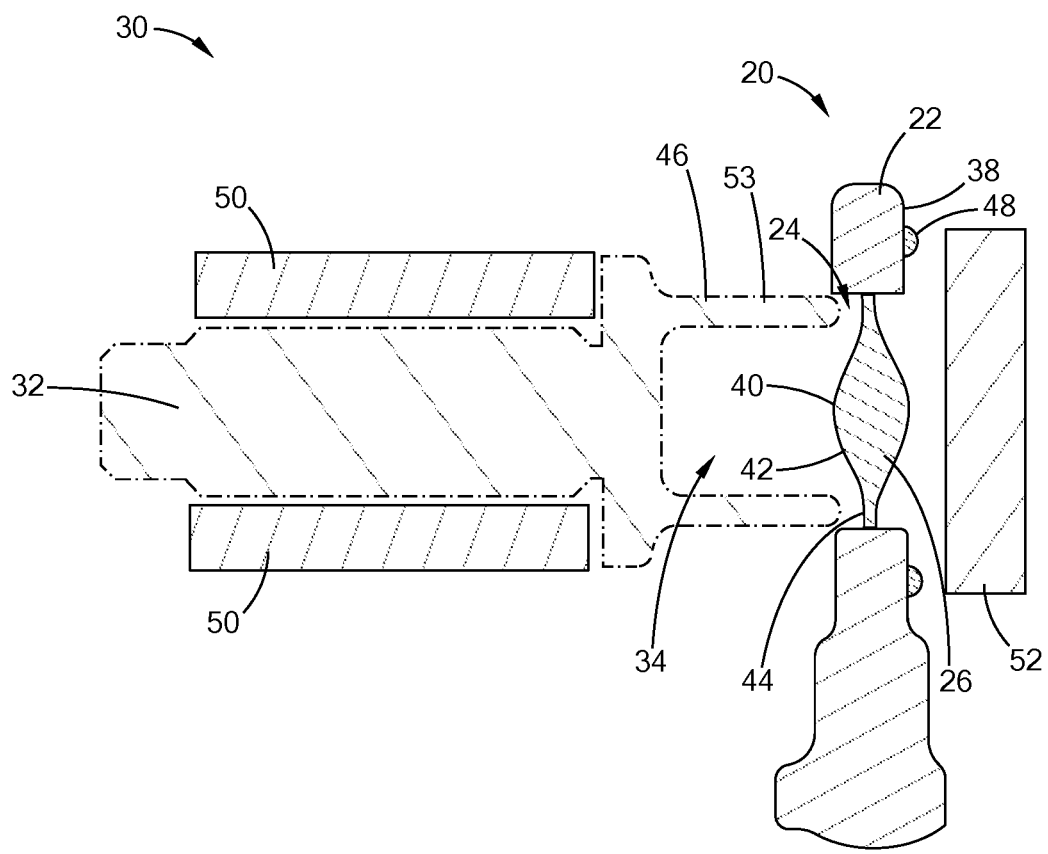
FIG. 4A is a cross-sectional view of the structural assembly illustrating one of the fasteners prior to staking into the structural assembly according to the present disclosure.
Figure 4B:
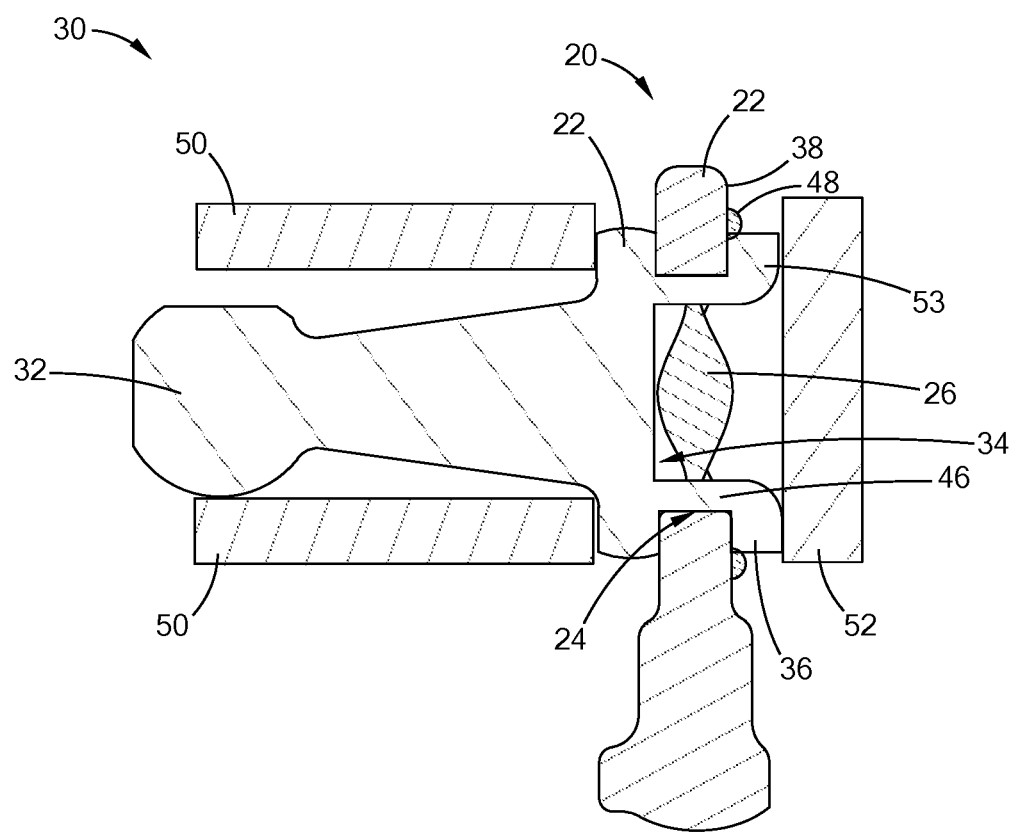
FIG. 4B is a cross-sectional view of the fastener of FIG. 4A staked into the structural assembly according to the present disclosure.
Figure 5:
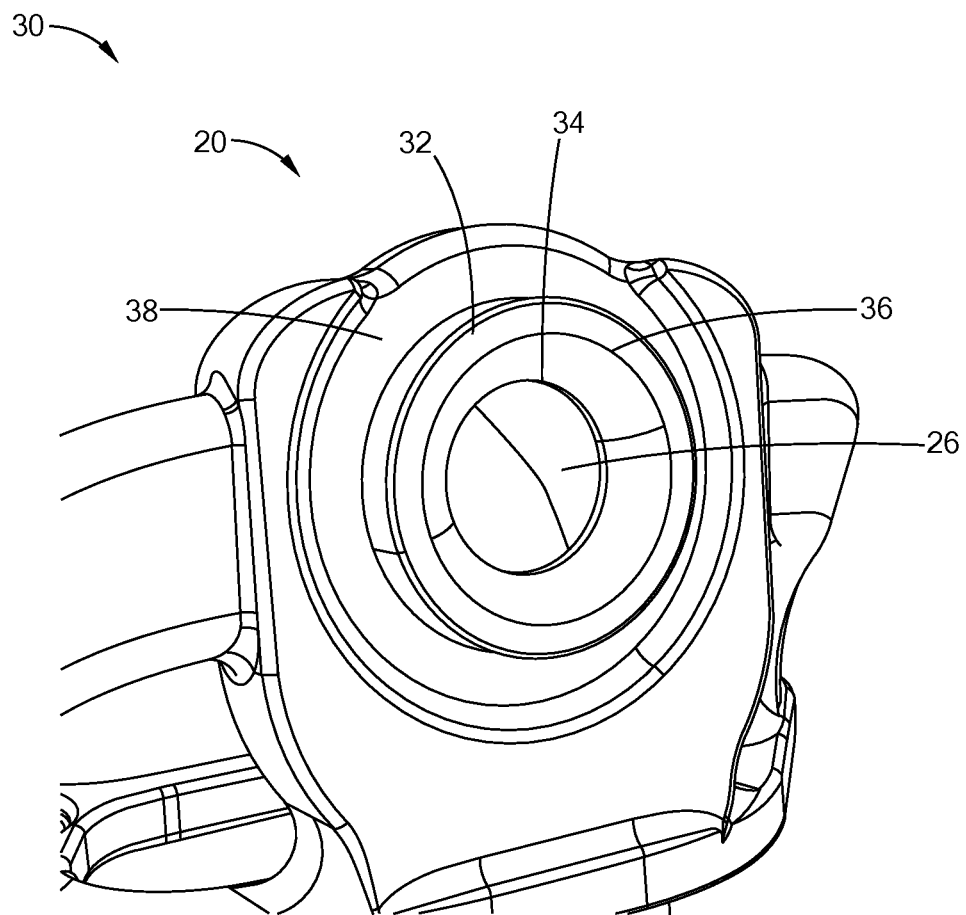
FIG. 5 is an enlarged perspective view of a rear surface of the structural assembly of FIG. 2 according to the present disclosure.

With reference to FIGS. 4A-4B and 5, the fastener 32 is shown prior to staking to the base 22 and after staking to the base 22. FIG. 4A shows the fastener 32 prior to staking to the base 22, and FIG. 4B shows the fastener 32 upon staking to the base 22. A punch 50 presses the fastener 32 against the support 26 in the void 24, and then the fastener 32 pierces the support 26 until reaching a die 52. In one form, the die 52 deforms a distal end portion 53 of the fastener 32 outward, to form a flange 36 along a rear surface 38 of the base 22. The flange 36 inhibits axial movement of the fastener 32 back through the void 24, securing the fastener 32 to the component 20. In another form, the die 52 stops the fastener 32 from being moved further by the punch 50 but does not deform the distal end portion 53 of the fastener 32 to form the flange 36. With the flange 36 being formed, the portion of the base 22 around the void 24 is captured between the flange 36 and a collar 55 of the fastener 32, thus securing the fastener 32 to the base 22.

As shown, the support 26 has a convex exterior profile including a dome 40 and a sloped side 42 extending outwardly from the dome 40. The sloped side 42 extends to a peripheral lip 44, which has a reduced thickness relative to the dome 40. The reduced thickness of the peripheral lip 44 allows the fastener 32 to break the peripheral lip 44 during the staking process, and the thicker dome 40 provides the dimensional stability for the fastener 32. The dome 40, sloped side 42, and peripheral lip 44 direct an outer edge 46 of the fastener 32 through the void 24 toward the base 22, centering the fastener 32 within the void 24. During the staking process, the outer edge 46 of the fastener 32 separates the peripheral lip 44 of the support 26 from the base 22, capturing the dome 40 within a cavity 34 of the fastener 32, thereby forming a "slug." It is understood that the support 26 may be referred to as a "slug" for the purposes of this disclosure. Capturing the slug within the cavity 34 of the fastener 32 forms a continuous load path between the base 22 and the fastener 32, across the cavity 34, thereby stabilizing the cavity 34 during the staking process. It should be understood, however, that the slug may be removed after staking while remaining within the scope of the present disclosure.

As further shown, the base 22 in one form includes a stop 48 disposed on the rear surface 38 (not shown in FIG. 5) which extends circumferentially around the void 24. When the flange 36 is formed as described above, the stop 48 functions as a stop to control deformation of the flange 36. And since the flange 36 abuts the stop 48, the stop 48 also functions as a seal thereby inhibiting moisture intrusion. Inhibiting moisture intrusion reduces the risk of corrosion of the fastener 32 and/or the component 20, particularly when the fastener 32, the component 20, and the vehicle structural elements being secured to the component 20 are dissimilar materials subject to galvanic corrosion.

The structural assembly 30 of the present disclosure uses additive manufacturing to overcome joining barriers associated with the integration of vehicle structures. Incorporating separate fasteners 32, such as bolts, nuts, and studs, into a joint allows joining of parts in a vehicle that may be difficult to otherwise join. The supports 26 of the additively manufactured component 20 allow for mass production of joints that have bolt-on applications with tight tolerances for voids 24 into which the fasteners 32 are staked. By leveraging advances in additive manufacturing to build the supports 26 in the voids 24, the voids 24 have improved dimensional stability to improve joint strength when the fasteners 32 capture the slugs to form the mechanical joint.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly, comprising:
a fastener; and
an additively manufactured component comprising:
a base;
a void defined in the base; and
a support disposed across the void,
wherein the fastener is secured to the base within the void, and the support is captured within a distal end portion of the fastener.

2. The structural assembly of claim 1, wherein the support is contiguous with a periphery of the void.

3. The structural assembly of claim 1, wherein a distal end portion of the fastener includes a flange extending along a rear surface of the base.

4. The structural assembly of claim 3, wherein the base includes a stop extending around the void on the rear surface, wherein the flange of the fastener abuts the stop.

5. The structural assembly of claim 1, wherein the distal end portion of the fastener defines a cavity, and the support is captured within in the cavity.

6. The structural assembly of claim 1, wherein the support has a convex exterior profile including a dome and sloped sides extending from the dome.

7. The structural assembly of claim 1, wherein the fastener is a threaded stud.

8. The structural assembly of claim 1, wherein the fastener is a ball stud.

9. The structural assembly of claim 1, wherein the support includes a peripheral lip.

10. A method for forming a structural assembly, the method comprising:
additively manufacturing a base of the structural assembly, the base including a void;
additively manufacturing a support across the void;
locating a fastener onto the support; and
staking the fastener to the base through the support.

11. The method of claim 10, wherein staking the fastener further comprises punching the fastener between the support and the base and deforming a distal end portion of the fastener into a flange along a rear surface of the base.

12. The method of claim 10, wherein staking the fastener further comprises capturing the support in a cavity of the fastener.

13. The method according to claim 12, wherein the support is removed from the cavity.

14. The method of claim 10, wherein additively manufacturing the base and the support further comprises applying metal powder and a liquid adhesive into a plurality of layers and heating the plurality of layers to remove the adhesive.

15. The method of claim 10, further comprising deforming the distal end portion of the fastener along a rear surface of the base and engaging a stop disposed on the rear surface of the base.

16. The method of claim 10, wherein additively manufacturing the support further comprises additively manufacturing a slug and a peripheral lip extending from the slug to the base.

17. The method of claim 16, wherein staking the fastener further comprises separating the peripheral lip from the base and securing the slug in a cavity of the fastener.

18. The method of claim 10, further comprising additively manufacturing the base and the support in a metal jet binding process.

19. An additively manufactured component configured to join structural components together, the additively manufactured component comprising:
a base;
a void defined in the base; and
a support disposed across the void, the support defining a convex exterior profile including a central dome, sloped sides extending from the central dome, and a peripheral lip.

20. The additively manufactured component of claim 19, further comprising a stop extending around the void.

* * * * *